No. 684,757. Patented Oct. 15, 1901.
L. HARDY.
SALT CELLAR.
(Application filed Feb. 8, 1901.)
(No Model.)

Witnesses
Gladys L. Thompson
Genevieve Matthews

Inventor
Leroy Hardy.
By R. S. & A. D. Lacey
Attorneys

THE NORRIS PETERS CO., PHOTO-LITHO., WASHINGTON, D. C.

UNITED STATES PATENT OFFICE.

LEROY HARDY, OF TILMAN, INDIANA.

SALT-CELLAR.

SPECIFICATION forming part of Letters Patent No. 684,757, dated October 15, 1901.

Application filed February 8, 1901. Serial No. 46,569. (No model.)

*To all whom it may concern:*

Be it known that I, LEROY HARDY, a citizen of the United States, residing at Tilman, in the county of Carroll and State of Indiana, have invented certain new and useful Improvements in Salt-Cellars; and I do hereby declare the following to be a full, clear, and exact description of the invention, such as will enable others skilled in the art to which it appertains to make and use the same.

This invention relates to holders for condiments—such as salt, pepper, and analogous seasonings in powdered or granular form—and is designed to prevent clogging and insure a positive delivery of the salt under all conditions.

The invention consists of a revoluble ball-shaped feeder at the mouth of the vessel containing the salt, having grooves or depressions in its surface to take up a quantity of the salt and deliver the same in its rotation.

For a full description of the invention and the merits thereof and also to acquire a knowledge of the details of construction of the means for effecting the result reference is to be had to the following description and drawings hereto attached.

While the essential and characteristic features of the invention are necessarily susceptible of modification, still the preferred embodiment of the invention is illustrated in the accompanying drawings, in which—

Figure 1:
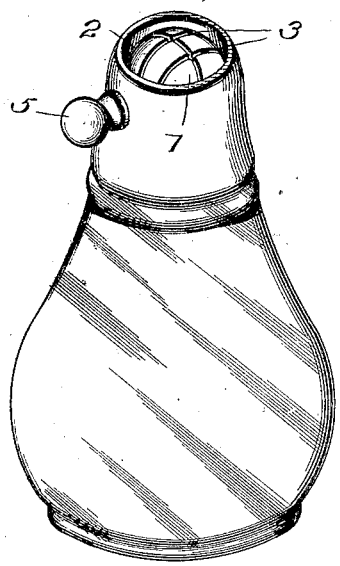
Figure 2:
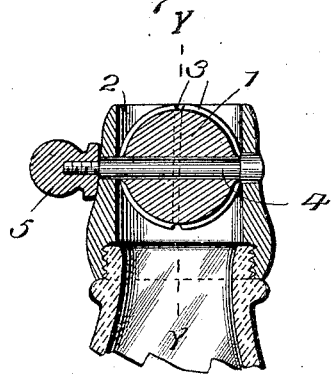
Figure 3:
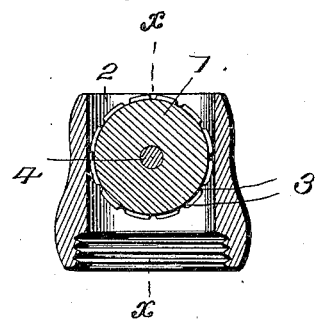

Figure 1 is a perspective view of a salt-cellar, pepper-shaker, or like condiment-holder embodying the invention. Fig. 2 is a section on the line X X of Fig. 3. Fig. 3 is a section on the line Y Y of Fig. 2.

Corresponding and like parts are referred to in the following description and indicated in all the views of the drawings by the same reference characters.

The feeder may be applied directly to the body of the salt-cellar or condiment-holder or may be fitted to a cap having screw-thread connection with the holder, the latter construction being preferred, as it admits of the ready replenishing of the holder when desired.

The feeder 1 is located at the mouth of the holder 2 and is mounted for rotation to admit of the grooves or depressions 3, formed therein, passing across the mouth of the holder to receive a supply and to discharge it upon the food as desired. The feeder is of a size to fill the neck of the holder 2 and is ball-shaped, although other forms may be devised to suit the shape of the neck or outlet of the holder 2. The grooves or depressions 3 may be of any size, shape, or extent so long as they provide cavities to receive a portion of the seasoning when facing the interior of the holder and deliver the same when facing out from the holder.

The stem 4 upon which the feeder is mounted is journaled in opposite sides of the holder and is provided at one end with a thumb-piece 5, to be grasped between the thumb and finger when rotating the feeder to obtain a delivery of the salt. The stem may be cemented or otherwise secured to the feeder to prevent disengagement.

The feeder may be of glass, metal, wood, celluloid, or other composition, and the stem may be of the same or different material. The term "holder" applies to the body including the cap or to the cap and is to be construed as designating the support for the feeder.

Having thus described the invention, what is claimed as new is—

A salt-cellar or condiment-holder provided with a revoluble feeder of ball shape fitted in the neck or opening and having cavities in its surface, substantially as specified.

In testimony whereof I affix my signature in presence of two witnesses.

LEROY HARDY. [L. S.]

Witnesses:
WILLIAM P. QUINN,
DAVID H. HARDY.